W. WESTERFIELD.
Street-Sprinkler.

No. 159,874.

Patented Feb. 16, 1875.

WITNESSES:
A Bennerkendorf.
A. F. Terry

INVENTOR:
W. Westerfield
BY
Munn
ATTORNEYS.

THE GRAPHIC CO.PHOTO-LITH.39 & 41 PARK PLACE,N.Y.

UNITED STATES PATENT OFFICE.

WILLIAM WESTERFIELD, OF NEW YORK, N. Y.

IMPROVEMENT IN STREET-SPRINKLERS.

Specification forming part of Letters Patent No. 159,874, dated February 16, 1875; application filed November 14, 1874.

*To all whom it may concern:*

Be it known that I, WILLIAM WESTERFIELD, of the city, county, and State of New York, have invented a new and Improved Street-Sprinkler, of which the following is a specification:

The invention will first be fully described, and then pointed out in the claims.

Figure 1:
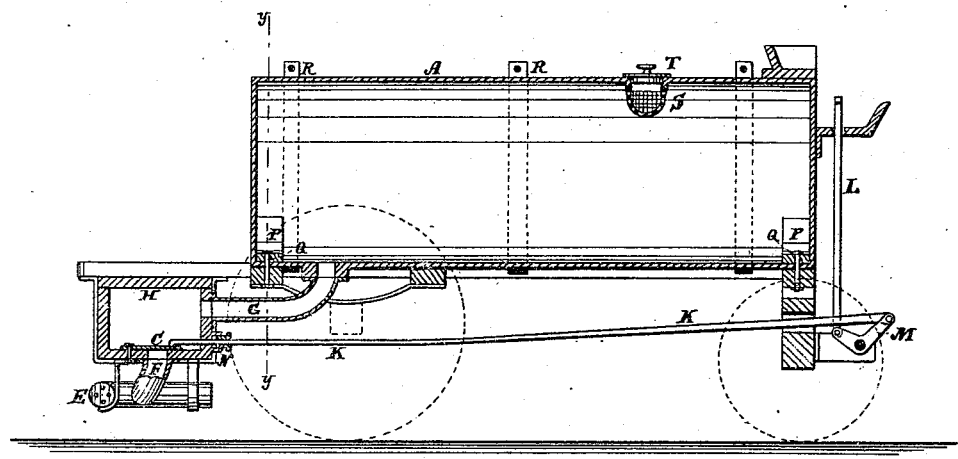
Figure 2:
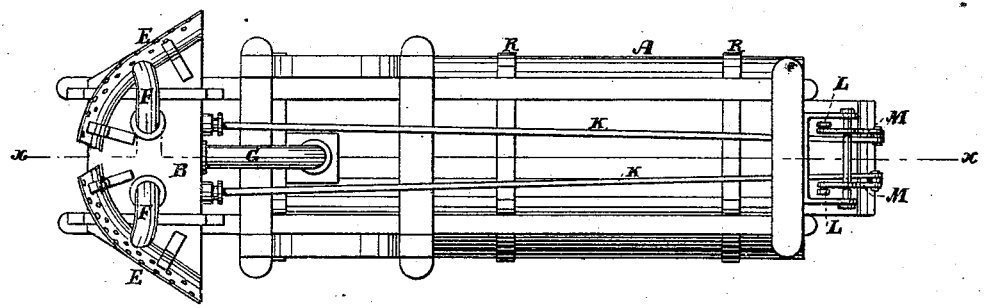
Figure 3:
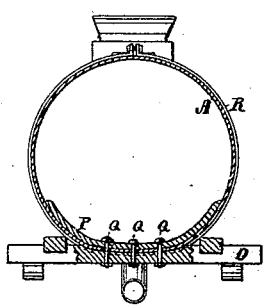

Figure 1 is a longitudinal sectional elevation of a sprinkling-machine contrived according to my invention, taken on the line $x\ x$ of Fig. 2. Fig. 2 is a plan view of the under side, and Fig. 3 is a transverse section taken on the line $y\ y$ of Fig. 1.

Similar letters of reference indicate corresponding parts.

A is the main tank, behind and a little below which I propose to arrange a valve-tank, B, to contain the valves C, and to which the sprinkling-tubes E are connected by short pipes F, the said tank being connected to the principal tank by a pipe, G. This valve-tank will have a portion, H, of the cover contrived to be readily removed to afford access to the valves for adjusting them, removing obstructions from them, and for other purposes, thus saving the necessity of entering the main tank through the inlet-passage T, as is required when the valves are arranged in the main tank; and, besides, the connections of the sprinkling-tubes are so much shorter by this arrangement that the water stops flowing much sooner than in the old way, which enables the operator to control the work better, and be more exact in stopping and starting the flow at cross-walks and the like.

Another advantage of the arrangement is, that the valve-rods may connect with the valves without entering the main tank, and may extend along under it to the front to connect with the foot-rods L by the bell-cranks M, for working them, thus having all the apparatus, except the portions of the rods, extending through the stuffing-boxes N exposed for inspection and repair without opening the main tank. In this example I have represented two sprinkling-tubes with a connecting-pipe, valve, and valve-actuating apparatus to each; but I may have one, two, or more, as may be found best. The main tank is flattened a little on the bottom to seat it fairly on the cross-pieces O of the frame, and inside it has a clamping-bar, P, fitted to it over each cross-piece, by which it is bolted firmly to the cross-pieces, the bolts Q being fitted through said bars and the shell of the tank. This mode is very simple and effective, and it leaves the hoops R, which have heretofore been passed through the cross-bars to hold the tank in place, free to be used only for strengthening the shell of the tank.

S represents a sieve of wire-cloth or other suitable reticulated material, which I propose to arrange at the inlet of the main tank for catching sticks, small fish, and other objects which are carried in the water, to prevent them from clogging the valves.

I will also, in practice, have a sieve at the top of the pipe leading from the main tank to the valve-tank.

Having thus described my invention, I claim as new and desire to secure by Letters Patent—

1. The combination of a valve-tank, B, containing the valves, with the principal tank A of a water-sprinkler, substantially as specified.

2. A water-sprinkler having a valve-tank independent of the main tank, and provided with sprinklers, as and for the purpose specified.

WILLIAM WESTERFIELD.

Witnesses:
T. B. MOSHER,
ALEX. F. ROBERTS.